United States Patent
Kimura et al.

(12)

(10) Patent No.: US 6,197,917 B1
(45) Date of Patent: Mar. 6, 2001

(54) METHOD FOR MANUFACTURING POLYCARBONATE FOR OPTICAL USE

(75) Inventors: Takato Kimura; Satoru Omori, both of Ichihara (JP); Ryozo Sato, Murcia (ES); Tomoaki Shimoda, Ichihara; Akio Kanezawa, Sodegaura, both of (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/376,450

(22) Filed: Aug. 18, 1999

(30) Foreign Application Priority Data

Sep. 2, 1998 (JP) .................................................. 10-248690

(51) Int. Cl.[7] .................................................... C08G 64/00
(52) U.S. Cl. ............................................ 528/196; 528/198
(58) Field of Search ...................................... 528/196, 198

(56) References Cited

FOREIGN PATENT DOCUMENTS 4-325284    11/1992   (JP) .
8-325184    12/1996   (JP) .

*Primary Examiner*—Terressa M. Boykin

(57) ABSTRACT

The specification provides a method for the manufacture of a high-quality optical polycarbonate that contains few inorganic or organic impurities or other microparticles, and that has a superior hue. Specifically, the specification provides a method for the manufacture of a polycarbonate by the melt polycondensation of a bisphenol and a carbonic diester, wherein the molten mixture of a bisphenol and a carbonic diester is filtered with a membrane filter made of a fluororesin, after which melt polycondensation is conducted.

7 Claims, No Drawings

METHOD FOR MANUFACTURING POLYCARBONATE FOR OPTICAL USE

CROSS-REFERENCE TO RELATED APPLICATIONS

Not applicable.

FEDERALLY SPONSORED RESEARCH

Not applicable

BACKGROUND OF THE INVENTION

DETAILED DESCRIPTION OF THE INVENTION

1. Technological Field of the Invention

The present application is a U.S. non-provisional application based upon and claiming priority from Japanese Application No. HEI 10-248690 which is hereby incorporated by reference.

The present invention relates to a method for manufacturing a high-quality optical polycarbonate that has a superior hue and very few microparticles formed from inorganic or organic foreign matter or the like.

2. Technological Background of the Invention

Because of their excellent impact resistance and other mechanical properties, and their excellent heat resistance, transparency, and so on, polycarbonates are widely used in applications such as various mechanical parts, optical disks, and automotive parts. They are hold particular promise for optical applications, such as memory-use optical disks, optical fibers, and lenses, and research is underway on a number of fronts.

Known methods for manufacturing these polycarbonates include a method in which a bisphenol such as bisphenol A is allowed to react directly with phosgene (interfacial method), and a method in which a bisphenol such as bisphenol A and a carbonic diester such as diphenyl carbonate are subjected to a melt polycondensation reaction (ester interchange reaction).

The interfacial methods involving phosgene that are commonly employed today require the use of a large amount of solvent such as methylene chloride, so it is extremely difficult to remove the chlorine, making these products undesirable as optical polycarbonates.

Meanwhile, an advantage of a melt polycondensation reaction method is that a polycarbonate can be manufactured less expensively than with an interfacial method. Also, no phosgene or other toxic substance is used, and no methylene chloride or other such solvent is necessary, so this method is very promising for the manufacture of optical polycarbonates.

A polycarbonate produced in a commercial plant generally contains between 5000 and 100,000 microparticles of submicron size per gram, and sometimes more than 10,000 microparticles are contained. There is also a great deal of variance in the number of microparticles contained in these polycarbonates.

When a polycarbonate is used in an optical application such as an optical disk, any microparticles on the order of microns that are admixed in the polycarbonate will become a source of light scattering, so the optical performance will be inconsistent and noise will be generated. Accordingly, a polycarbonate used in an optical disk needs to have foreign matter removed from it at a particularly high level of precision. The most common way to remove these is by using a filter. With a melt polycondensation reaction method, however, the obtained polycarbonate has a high melt viscosity, and when high precision filtration is performed using a filter directly, the differential pressure of the filter and other such factors impose a limit [on the filtration precision], making it very difficult to remove microparticles of submicron size. Meanwhile, there are methods for reducing the quantity of microparticles in a polycarbonate by removing the microparticles from the bisphenol used as a raw material in the manufacture of the polycarbonate. For instance, Japanese Laid-Open Patent Application 08-325184 discloses that excellent results will be obtained in terms of chemical stability and filtration precision if a membrane filter made of a fluororesin is used in the filtration of a bisphenol.

However, a problem encountered in filtering a molten bisphenol using a membrane filter made of a fluororesin is that the bisphenol has such a high surface tension that it does not readily pass through the filter. A complicated procedure is therefore required in which the surface of the fluororesin membrane filter is first wetted with a liquid having a lower surface tension, and this liquid is then replaced with a bisphenol, but even with this procedure, it is very difficult to filter a high-viscosity bisphenol efficiently over an extended period.

As a result of diligent research conducted in light of these problems, the inventors discovered that the foreign matter produced in the reactor in the polycondensation stage is relatively large in diameter, and that microparticles of submicron size are the result of inorganic and organic impurities and other such foreign matter contained in the raw materials, such as the bisphenol or carbonic diester, and also discovered that it is possible to manufacture a high-quality optical polycarbonate with the desired low microparticle content by effectively eliminating this foreign matter. The inventors further turned their attention to the fact that the surface tension of a molten mixture of a bisphenol and a carbonic diester is lower than that of a bisphenol alone, and upon subjecting a molten mixture of a bisphenol and a carbonic diester to high precision filtration with a membrane filter made of a fluororesin, they surprisingly succeeded at eliminating microparticles of submicron size without any pretreatment, and thereupon arrived at the present invention.

OBJECT OF THE INVENTION

The present invention was conceived in light of the above prior art, and an object thereof is to provide a method for manufacturing a high-quality optical polycarbonate with a low microparticle content.

SUMMARY OF THE INVENTION

The method pertaining to the present invention for manufacturing an optical polycarbonate is characterized in that, in the manufacture of a polycarbonate by the melt polycondensation of a bisphenol and a carbonic diester, a molten mixture of a bisphenol and a carbonic diester is filtered through a membrane filter made of a fluororesin, after which melt polycondensation is conducted.

It is preferable for the above-mentioned membrane filter made of a fluororesin to have an absolute filtration precision of 1.0 $\mu$m or less.

It is also preferable for the molten mixture of a bisphenol and a carbonic diester to be obtained by first filtering a bisphenol that is in a molten state and a carbonic diester that is in a molten state, and then mixing these.

Furthermore, it is preferable in the present invention for the polycarbonate that is the reaction product of the melt polycondensation to be further filtered while still in a molten state.

It is preferable for the bisphenol used in the present invention to be bisphenol A.

SPECIFIC DESCRIPTION OF THE INVENTION

The method pertaining to the present invention for manufacturing an optical polycarbonate will now be described in specific terms.

With the method pertaining to the present invention for manufacturing an optical polycarbonate, in the manufacture of a polycarbonate by the melt polycondensation of a bisphenol and a carbonic diester, a molten mixture of a bisphenol and a carbonic diester is filtered through a membrane filter made of a fluororesin, after which melt polycondensation is conducted.

Preparation of Molten Mixture

With the optical polycarbonate pertaining to the present invention, the first step is to prepare a molten mixture of a bisphenol and a carbonic diester.

There are no particular restrictions on the bisphenol used in the present invention, but examples include those expressed by the following Formula I.
Chemical Formula 1

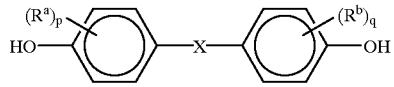

[I]

(In the formula, $R^a$ and $R^b$ are the same or different, and are each a halogen atom or a monovalent hydrocarbon group. p and q are integers from 0 to 4. X is

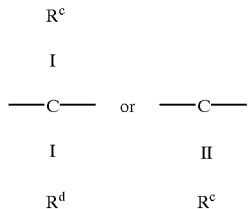

and $R^c$ and $R^d$ are each a hydrogen atom or a monovalent hydrocarbon group, where $R^c$ and $R^d$ may form a ring structure. Re is a divalent hydrocarbon group.)

Specific examples of the bisphenols expressed by the above Formula I include:

1,1-bis(4-hydroxyphenyl)methane, 1,1-bis(4-hydroxyphenyl)ethane, 2,2-bis(4-hydroxyphenyl)propane (hereinafter referred to as bisphenol A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, and other such bis(hydroxydiaryl)alkanes, and 1,1-bis(4-hydroxyphenyl)cyclopentane, 1,1-bis(4-hydroxyphenyl)cyclohexane, and other such bis(hydroxyaryl)cycloalkanes.

With the present invention, examples of bisphenols in which X in the above formula is —O—, —S—, —SO—, or —SO$_2$— include:

4,4'-dihydroxydiphenyl ether, 4,4'-dihydroxy-3,3'-dimethylphenyl ether, and other such bis(hydroxy[di]aryl) ethers, 4,4'-dihydroxydiphenyl sulfide, 4,4'-dihydroxy-3,3'-dimethylphenyl sulfide, and other such bis(hydroxydiaryl) sulfides, 4,4'-dihydroxydiphenyl sulfoxide, 4,4'-dihydroxy-3,3'-dimethylphenyl sulfoxide, and other such bis(hydroxydiaryl) sulfoxides, and 4,4'-dihydroxydiphenyl sulfone, 4,4'-dihydroxy-3,3'-dimethylphenyl sulfone, and other such bis(hydroxyaryl) sulfones.

Examples of other bisphenols are the compounds expressed by the following Formula II.
Chemical Formula 2

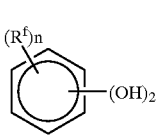

[II]

(In the formula, $R^f$ is a halogen atom or a $C_1$ to $C_{10}$ hydrocarbon group or halogen-substituted hydrocarbon group, and n is an integer from 0 to 4. When 2 is greater than or equal to 2, the $R^f$ groups may be the same or different.)

Specific examples of the bisphenols expressed by the above Formula II include: resorcin and substituted resorcin, such as 3-methylresorcin, 3-ethylresorcin, 3-propylresorcin, 3-butylresorcin, 3-t-butylresorcin, 3-phenylresorcin, 3-cumylresorcin, 2,3,4,6-tetrafluororesorcin, and 2,3,4,6-tetrabromoresorcin, catechol, and hydroquinone and substituted hydroquinone, such as is 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone, and 2,3,5,6-tetrabromohydroquinone.

The 2,2,2',2'-tetrahydro-3,3,3',3'-tetramethyl,1,1'-spirobi-[1H-indene]-6,6'-diol expressed by the following formula can also be used as the bisphenol.
Chemical Formula 3

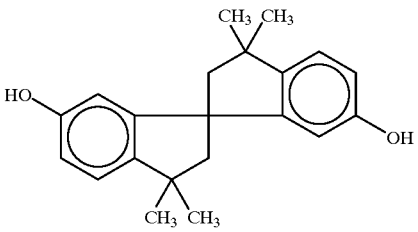

Of these bisphenols, one expressed by the above Formula I is preferable, and bisphenol A is particularly favorable.

With the present invention, these bisphenols may be filtered ahead of time while still in a molten state. This filtration treatment allows any microparticles contained in the raw material bisphenol to be filtered off, so that the fluororesin membrane filter discussed below does not have to be replaced as often.

There are no particular restrictions on the filter used in this filtration of the bisphenol, and any ordinary filter can be used. In specific terms, a flat type, cylinder type, candle type, or other such filter can be used. This filter should have an absolute filtration precision (pore diameter) of 20 $\mu$m or less, with 5 $\mu$m or less being preferable. If filtration is performed with a filter whose absolute filtration precision is over 20 $\mu$m, a large amount of bisphenol impurities will remain, and the fluororesin membrane filter may clog right away in the filtration of the molten mixture with a fluororesin membrane filter discussed below.

Specific examples of the carbonic diester used in the present invention include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, and dicyclohexyl carbonate. Two or more of these can also be used. Of these, diphenyl carbonate can be used to particular advantage.

The carbonic diester used in the present invention may contain a dicarboxylic acid or a dicarboxylic ester. In specific terms, the carbonic diester should contain no more than 50 mol %, and preferably no more than 30 mol %, dicarboxylic acid or a dicarboxylic ester.

Examples of this dicarboxylic acid or dicarboxylic ester include terephthalic acid, isophthalic acid, diphenyl terephthalate, diphenyl isophthalate, and other aromatic dicarboxylic acids, succinic acid, glutaric acid, adipic acid, pimelic acid, suberic acid, azelaic acid, sebacic acid, decanoic acid, dodecanoic acid, diphenyl sebacate, diphenyl decanedioate, diphenyl dodecanoate, and other aliphatic dicarboxylic acids, cyclopropanedicarboxylic acid, 1,2-cyclobutanedicarboxylic acid, 1,3-yclobutanedicarboxylic acid, 1,2-yclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxyldiphenylate, diphenyl 1,3-cyclohexanedicarboxylate, diphenyl 1,4-cyclohexanedicarboxylate, and other alicyclic dicarboxylic acids. The carbonic diester may also contain two or more types of these dicarboxylic acids and dicarboxylic esters.

With the present invention, these carbonic diesters may be filtered ahead of time while still in a molten state. This filtration treatment allows any microparticles contained in the raw material carbonic diester to be filtered off, so that the fluororesin membrane filter discussed below does not have to be replaced as often.

The filter used in this filtration treatment of the carbonic diester can be the same as the above-mentioned one used to filter the bisphenol.

With the present invention, the above-mentioned carbonic diester and bisphenol are usually mixed such that there is 1.0 to 1.30 mol, and preferably 1.01 to 1.20 mol, of carbonic diester per mole of bisphenol.

Here, the liquid mixture of the carbonic diester and bisphenol may contain a melt polycondensation catalyst.

This melt polycondensation catalyst is usually (a) an alkali metal compound and/or an alkaline earth metal compound (hereinafter referred to as (a) alkali (alkaline earth) metal compound).

Organic acid salts, inorganic acid salts, oxides, hydroxides, hydrides, alcoholates, and the like of alkali metals and alkaline earth metals can be used favorably as the (a) alkali (alkaline earth) metal compound.

Specific examples of alkali metal compounds include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenide, sodium benzoate, potassium benzoate, lithium benzoate, disodium hydrogenphosphate, dipotassium hydrogenphosphate, dilithium hydrogenphosphate, a disodium salt, dipotassium salt, or dilithium salt of bisphenol A, and a sodium salt, potassium salt, and lithium salt of a phenol; while specific examples of alkaline earth metal compounds include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Two or more of these compounds may be used together.

It is preferable for this alkali (alkaline earth) metal compound to be present in the melt polycondensation reaction in an amount of $1 \times 10^{-3}$ to $1 \times 10^{-3}$ mol, and preferably $1 \times 10^{-7}$ to $2 \times 10^{-6}$ mol, per mole of the bisphenol. When the alkali (alkaline earth) metal compound is contained in the bisphenol that serves as the raw material for the melt polycondensation reaction, it is preferable for the added amount to be controlled such that the amount in which the alkali (alkaline earth) metal compound is present during the melt polycondensation reaction will be within the above range per mole of bisphenol.

In addition to the above-mentioned (a) alkali (alkaline earth) metal compound, a (b) basic compound can also be used concurrently as the melt polycondensation catalyst.

Examples of this (b) basic compound are nitrogen-containing basic compounds that readily decompose or volatilize at high temperature. The following compounds are specific examples.

Tetramethyl ammonium hydroxide ($Me_4NOH$), tetraethyl ammonium hydroxide ($Et_4NOH$), tetrabutyl ammonium hydroxide ($Bu_4NOH$), trimethylbenzyl ammonium hydroxide ($\phi—CH_2(Me)_3NOH$), and other such ammonium hydroxides having alkyl, aryl, alkaryl, or other such groups, trimethylamine, triethylamine, dimethylbenzylamine, triphenylamine, and other tertiary amines, secondary amines expressed by $R_2NH$ (where R is a methyl, ethyl, or other alkyl, or a phenyl, toluyl, or other aryl group, or the like), primary amines expressed by $RNH_2$ (where R is defined the same as above), 4-dimethylaminopyridine, 4-diethylaminopyridine, 4-pyrolidinopyridine, and other pyridines, 2-methylimidazole, 2-phenylimidazole, and other imidazoles, and ammonia, tetramethyl ammonium borohydride (Me$_4$NBH$_4$), tetrabutyl ammonium borohydride (Bu$_4$NBH$_4$), tetrabutyl ammonium tetraphenylborate (Bu$_4$NBPh$_4$), tetramethyl ammonium tetraphenyl borate (Me$_4$NBPh$_4$), and other basic salts.

Of these, tetraalkyl ammonium hydroxides, and particularly electronics-use tetraalkyl ammonium hydroxides with few metal impurities, can be used favorably.

The above-mentioned (b) nitrogen-containing basic compound can be used in an amount of $1 \times 10^{-6}$ to $1 \times 10^{-1}$ mol, and preferably $1 \times 10^{-5}$ to $1 \times 10^{-2}$ mol, per mole of the bisphenol.

(c) A boric acid compound can also be used as a catalyst.

Examples of this (c) boric acid compound are boric acid and boric esters.

Examples of boric esters include the boric esters expressed by the following general formula.

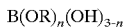

(Where R is a methyl, ethyl, or other alkyl, or a phenyl or other aryl group, and n is 1, 2, or 3.)

Specific examples of these boric esters include trimethyl borate, triethyl borate, tributyl borate, trihexyl borate, triheptyl borate, triphenyl borate, tritolyl borate, and trinaphthyl borate.

This (c) boric acid or boric ester can be used in an amount of $1 \times 10^{-8}$ to $1 \times 10^{-1}$ mol, and preferably $1 \times 10^{-7}$ to $1 \times 10^{-2}$ mol, and even more preferably $1 \times 10^{-6}$ to $1 \times 10^{-4}$ mol, per mole of the bisphenol.

With the present invention, it is preferable to combine, for example, (a) an alkali (alkaline earth) metal compound with (b) a nitrogen-containing basic compound, or to combine all three: (a) an alkali (alkaline earth) metal compound, (b) a nitrogen-containing basic compound, and (c) boric acid or a boric ester.

It is preferable to use as a catalyst a combination of (a) an alkali (alkaline earth) metal compound and (b) a nitrogen-containing basic compound in the above amounts because the polycondensation reaction will proceed at a sufficient rate and a high molecular weight polycarbonate can be produced at a high polymerization activity.

When (a) an alkali (alkaline earth) metal compound and (b) a nitrogen-containing basic compound are used together, or when (a) an alkali (alkaline earth) metal compound, (b) a nitrogen-containing basic compound, and (c) boric acid or a boric ester are used together, a mixture of the catalyst components may be added to the molten mixture of a bisphenol and a carbonic diester, or each component may be added separately to the molten mixture of a bisphenol and a carbonic diester.

These melt polycondensation catalysts may be added to the molten mixture of a bisphenol and a carbonic diester ahead of time, before it is filtered with the fluororesin membrane filter, but they may also be added to the molten mixture of a bisphenol and a carbonic diester after the filtration treatment. Alternatively, part of the melt polycondensation catalysts may be added to the molten mixture of a bisphenol and a carbonic diester ahead of time, before it is filtered with the fluororesin membrane filter, and the rest of the melt polycondensation catalysts added to the molten mixture of a bisphenol and a carbonic diester after the filtration treatment. When the polycondensation is conducted in stages, the polycondensation catalyst can be added in a number of batches, as long as the total amount of catalyst components (a) to (c) is within the range given above.

Filtration Treatment of Molten Mixture

Next, with the present invention, the molten mixture prepared as above is filtered to remove any microparticles or the like in the liquid mixture. In specific terms, a bisphenol and carbonic diester in a molten state are continuously supplied to an agitation tank for mixing, and after being agitated and mixed for a specific length of time, the liquid is filtered. While the surface tension of bisphenol A is 32 dyn/cm$^2$ (180° C.), the surface tension of a 1:1 mixture of bisphenol A and diphenyl carbonate is 22 dyn/cm$^2$ (160° C.).

With the present invention, the filtration treatment is carried out using a membrane filter made from a fluororesin.

Filters are generally classified by their trapping mechanism into depth types, which trap particles and other solids in the openings of the filter by contact adhesion, and screen types, which trap solids by sifting them at the filter surface, and the fluororesin membrane filter used in the present invention usually comes under the heading of a screen type.

The fluororesin that makes up this filter is a resin composed of a polymer obtained from a monomer containing one or more fluorine atoms, or a copolymer whose principal component is this monomer. Specific examples include a polytetrafluoroethylene resin (PTFE), a perfluoroalkoxy resin (PFA), a tetrafluoroethylene-hexafluoropropylene copolymer (FEP), an EPE resin obtained by copolymerizing a PFA resin with a tiny amount of hexafluoropropylene, an ethylene-hexafluoroethylene resin (ETFE), and a polychlorotrifluoroethylene resin (ECTFE). Of these, PTFE, which is widely known as Teflon (trade name of DuPont), is preferred. Typical examples of this fluororesin membrane filter that can be used in an industrial setting are Fluorite (trade name of Japan MemTech), Super-Cheminert (trade name of Pall Japan), and other such cartridge type filters.

The filtration precision (pore diameter) of the fluororesin membrane filter used in the present invention will vary with the diameter of the microparticles contained in the treatment liquid, how many are contained, the pressure loss of the filter, and other factors, but should be 1.0 μm or less in terms of microparticle removal efficiency.

In particular, when there is a need to remove microparticles of 1.0 μm or smaller to a high degree of precision, a filter with a filtration precision of 0.5 μm, and particularly 0.2 μm, should be used.

Filtration will also vary with the viscosity, etc., of the treatment liquid, but it is usually preferable for the liquid to pass through at a flux of 15 to 60 kg/min per square meter of filter.

Polycondensation Step

Melt polycondensation is conducted using the filtered molten mixture in the presence of a melt polycondensation catalyst.

A polycondensation reaction of a bisphenol and a carbonic diester can be conducted under the same polycondensation reaction conditions known in the past.

In specific terms, the first stage reaction involves allowing the bisphenol and the carbonic diester to react under normal pressure for 0 to 5 hours, and preferably 0 to 4 hours, and even more preferably 0 to 3 hours, at a temperature of 80 to 250° C., and preferably 100 to 230° C., and even more preferably 120 to 190° C. The reaction system is then reduced in pressure while the reaction temperature is raised to continue the reaction between the bisphenol and the carbonic diester, and finally the bisphenol and the carbonic diester are subjected to a polycondensation reaction at 240 to 320° C. under reduced pressure of 5 mmHg or less, and preferably 1 mmHg or less.

The above-mentioned polycondensation reaction may be a continuous or batch process. The reaction apparatus used in conducting this reaction may be a tank type or a tube type.

With the present invention, a polyfunctional compound having three or more functional groups per molecule can also be used along with the above-mentioned bisphenol and carbonic diester in the manufacture of the polycarbonate. A compound having phenolic hydroxyl groups or carboxyl groups is favorable as this polyfunctional compound, and a compound having three phenolic hydroxyl groups is particularly favorable. Examples include 1,1,1-tris(4-hydroxyphenyl)ethane, 2,2',2"-tris(4-hydroxyphenyl) diisopropyl-benzene, α-methyl-α,α',α'-tris(4-hydroxyphenyl)-1,4-diethylbenzene, α,α',α'-tris(4-hydroxyphenyl)- 1,3,5-triisopropylbenzene, phloroglycine, 4,6-dimethyl-2,4,6-tri(4-hydroxyphenyl)-heptane-2, 1,3,5-tri(4-hydroxyphenyl)benzene, 2,2-bis-[4,4-(4,4'-dihydroxyphenyl)-cyclohexyl]-propane, trimellitic acid, 1,3,5-benzenetricarboxylic acid, and pyromellitic acid.

Of these, 1,1,1-tris(4-hydroxyphenyl)ethane, α,α',α'-tris (4-hydroxyphenyl)-1,3,5-triisopropylbenzene, and the like are preferred.

This polyfunctional compound usually can be used in an amount of 0.03 mol or less, and preferably 0.001 to 0.02 mol, and even more preferably 0.001 to 0.01 mol, per mole of the bisphenol.

With the present invention, a terminal capping agent may be used along with the above-mentioned aromatic dihydroxy compound and carbonic diester. Allyloxy compounds capable of introducing terminal groups expressed by the following General Formula I at the molecular terminals of the obtained polycarbonate can be used as this terminal capping agent.

ArO—      [I]

In the formula, Ar is an aromatic hydrocarbon group with 6 to 50 carbon atoms. There are no particular restrictions on the aromatic hydrocarbon group, which may be a phenyl group, naphthyl group, anthranyl group, or other condensed ring, and furthermore a ring may be formed by one of these aromatic rings and a saturated hydrocarbon and/or hetero atom. These aromatic rings may also be substituted with a halogen or an alkyl group with 1 to 9 carbon atoms.

Specific examples of terminal groups expressed by this Formula I include the phenoxy group, p-tert-butylphenoxy group, p-cumylphenoxy group (p-phenylisopropylphenoxy group), and chromanylphenoxy group having a skeleton expressed by the following respective formulas:
a phenoxy group expressed by
Chemical Formula 4

    [IV]

a p-tert-butylphenoxy group expressed by
Chemical Formula 5

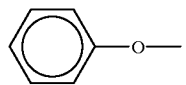
    [V]

a p-cumylphenoxy group (p-phenylisopropylphenoxy groups) expressed by

Chemical Formula 6

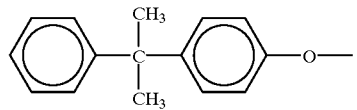
    [VI]

and a chromanylphenoxy group expressed by
Chemical Formula 7

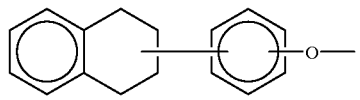
    [VII]

The following compounds are specific examples of compounds that can introduce the above-mentioned terminal groups into the obtained polycarbonate molecules with the present invention. With the compounds listed below, aromatic rings or aliphatic rings may be substituted with an alkyl group having 1 to 9 carbon atoms.

Examples of compounds that can introduce the phenoxy group expressed by the above-mentioned Formula IV include phenol and diphenyl carbonate. Examples of compounds that can introduce the p-tert-butylphenoxy group expressed by the above-mentioned Formula V include p-tert-butylphenol, p-tert-butylphenylphenyl carbonate, and p-tert-butylphenyl carbonate.

Examples of compounds that can introduce the p-cumylphenoxy group expressed by the above-mentioned Formula VI include p-cumylphenol, p-cumylphenylphenyl carbonate, and p-cumylphenyl carbonate.

More specifically, examples of the chromanylphenoxy group expressed by General Formula VII include the following chromanylphenoxy groups.
Chemical Formula 8

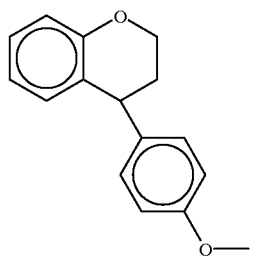
    [VIII]

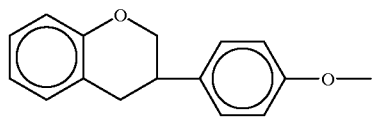
    [IX]

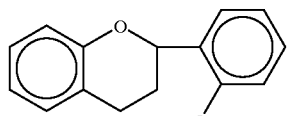
    [X]

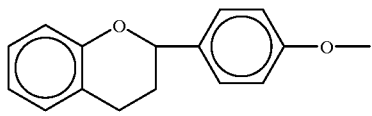

In specific terms, the following chroman compounds are examples of compounds that can introduce the chromanylphenoxy group expressed by the above Formula VIII.

2,2,4-trimethyl-4-(4-hydroxyphenyl)chroman, 2,2,4,6-tetramethyl-4-(3,5-dimethyl-4-hydroxyphenyl)chroman, 2,3,4-trimethyl-2-ethyl-4-(3-nonyl-4-hydroxyphenyl)-7-nonyl-chroman, 2,2,4-trimethyl-4-(3,5-diethyl-4-hydroxyphenyl)-6-ethylchroman, 2,2,4,6,8-pentamethyl-4-(3,5-dimethyl4-hydroxyphenyl)chroman, 2,2,4-triethyl-3-methyl4-(4-hydroxyphenyl)chroman, 2,2,4-trimethyl-4-(3-bromo-4-hydroxyphenyl)chroman, 2,2,4-trimethyl4-(3-bromo-4-hydroxyphenyl)-6-bromochroman, 2,2,4-trimethyl4-(3,5-dibromo-4-hydroxyphenyl)-6-bromochroman, and 2,2,4-trimethyl-4-(3,5-dibromo-4-hydroxyphenyl)-6,8-dibromochroman.

Of these, 2,2,4-trimethyl-4-(4-hydroxyphenyl) chroman is particularly favorable.

In specific terms, the following chroman compounds are examples of compounds that can introduce the chromanyiphenoxy group expressed by the above Formula IX.

2,2,3-tri-tethyl-3-(4-hydroxyphenyl)chroman, 2,2,3,6-tetramethyl-3-(3,5-dimethyl-4-hydroxyphenyl)chroman, 2,3,4-trimethyl-2-ethyl-3-(3-nonyl-4-hydroxyphenyl)-7-nonyl-chroman, 2,2,3-trimethyl-3-(3,5-diethyl-4-hydroxyphenyl)-6-ethylchroman, 2,2,3,6,8-pentamethyl-3-(3,5-dimethyl-4-hydroxyphenyl)chroman, 2,2,3-triethyl-3-methyl-3-(4-hydroxyphenyl)chroman, 2,2,3-trimethyl-3-(3-bromo-4-hydroxyphenyl)-6-bromochroman, 2,2,3-trimethyl-3-(3,5-dibromo4-hydroxyphenyl)-6-bromochroman, and 2,2,3-trimethyl-3-(3,5-dibromo-4-hydroxyphenyl)-6,8-dibromochroman.

Of these, 2,2,3-trimethyl-3-(4-hydroxyphenyl)chroman is particularly favorable.

In specific terms, the following chroman compounds are examples of 20 compounds that can introduce the chromanylphenoxy group expressed by the above Formula X.

2,4,4-trimethyl-2-(2-hydroxyphenyl)chroman, 2,4,4,6-tetramethyl-2-(3,5-dimethyl-2-hydroxyphenyl)chroman, 2,3,4-trimethyl-4-ethyl-2-(3,5-dimethyl-2-hydroxyphenyl)-7-nonyl-chroman, 2,4,4-trimethyl-2-(3,5-dimethyl-2-hydroxyphenyl)-6-ethyl-chroman, 2,4,4,6,8-pentamethyl-2-(3,5-dimethyl-2-hydroxyphenyl)-6-ethylchroman, 2,4,4-trimethyl-2-(3-bromo-2-hydroxyphenyl)chroman, 2,4,4-trimethyl-2-(3-bromo-2-hydroxyphenyl)-6-bromochroman, 2,4,4-trimethyl-2-(3,5-dibromo-2-hydroxyphenyl)-6-bromochroman, and 2,4,4-trimethyl-2-(3,5-dibromo-2-hydroxyphenyl)-6,8-dibromochroman.

Of these, 2,2,4-trimethyl-2-(2-hydroxyphenyl)chroman is particularly favorable.

In specific terms, the following chroman compounds are examples of compounds that can introduce the chromanylphenoxy group expressed by the above Formula XI.

Specific examples of compounds that can introduce a chromanylphenoxy group expressed by the above-mentioned Formula XI include 2,4,4-trimethyl-2-(4-hydroxy-phenyl)chroman, 2,4,4,6-tetramethyl-2-(3,5-dimethyl-4-hydroxyphenyl)chroman, 2,4,4-triethyl-2-(4-hydroxy-phenyl)chroman, 2,4,4-trim ethyl-2-(3,5-diethyl-4-hydroxyphenyl)-6-ethyl-chroman, 2,4,4,6,8-pentamethyl-2-(3,5-dinethyl 4-hydroxyphenyl)-6-ethyl -chroman, 2,4,4-trimethyl-2-(3-bromo-4-hydroxyphenyl)chroman, 2,4,4-trimethyl-2-(3-bromo-4-hydroxyphenyl)-6-bromochroman, 2,4,4-trimethyl-2-(3,5-dibromo4-hydroxyphenyl)-6-bromochroman, and 2,4,4-trimethyl-2-(3,5-bromo-4-hydroxyphenyl)-6,8-dibromochroman.

Of these, 2,4,4-trimethyl-2-(4-hydroxy-phenyl)chroman is particularly favorable.

The above-mentioned compounds capable of introducing a terminal group expressed by General Formula I can each be used by itself, or two or more can be used in combination.

In the present invention, the above-mentioned allyloxy compound is usually used in an amount of 0.01 to 0.2 mol, and preferably 0.02 to 0.15 mol, and even more preferably 0.02 to 0.1 mol, per mole of aromatic dihydroxy compound.

If the allyloxy compound is used in this amount as a terminal capping agent, the molecular terminals of the polycarbonate that is obtained can be capped with terminal groups expressed by the above-mentioned General Formula I in a proportion of 1 to 95%, and preferably 10 to 95%, and even more preferably 20 to 90%.

A polycarbonate in which terminal groups expressed by General Formula I have been introduced as above in the proportion given above will have superior heat resistance, and will also have superior mechanical properties such as impact resistance even at a low molecular weight.

With the present invention, an aliphatic monocarboxy compound capable of introducing aliphatic hydrocarbon units expressed by the following General Formula XII may be used as needed along with the above-mentioned allyloxy compound.
Chemical Formula 9

In the formula, R is an alkyl with 10 to 30 carbon atoms, may be straight chain or branched, and may be substituted with a halogen.

Specific examples of compounds that can introduce aliphatic hydrocarbon units (aliphatic carboxyl groups) expressed by the above Formula XII at the terminals of the polycarbonate molecules include aliphatic monocarboxylic acids and aliphatic monocarboxylic esters.

Specific examples of these compounds include undecanoic acid, lauric acid, tridecanoic acid, pentadecanoic acid, palmitic acid, heptadecanoic acid, stearic acid, nonadecanoic acid, heneicosanoic acid, tricosanoic acid, melissic acid, and other such alkylmonocarboxylic acids; and methyl stearate, ethyl stearate, phenyl stearate, and other such methyl esters, ethyl esters, and phenyl esters of alkylmonocarboxylic acids, and other such alkylmonocarboxylic esters.

These may be used singly or as in combinations.

Of these, stearic acid, methyl stearate, ethyl stearate, phenyl stearate, and the like can be used most favorably.

These aliphatic monocarboxy compounds are usually used in an amount of 0.01 to 0.20 mol per mole of aromatic dihydroxy compound, with an amount of 0.02 to 0.15 mol being preferable, and an amount of 0.02 to 0.10 mol being even better.

The polymerization velocity will tend to decrease if terminal capping agents containing the above-mentioned allyloxy compounds are used in a total amount of more than 0.2 mol per mole of aromatic dihydroxy compound.

With the present invention, the above-mentioned terminal capping agent is used in the melt polycondensation of the aromatic dihydroxy compound and the carbonic diester.

This melt polycondensation is conducted in the presence of a catalyst containing the following alkali metal compound and/or alkaline earth metal compound.

The terminal capping agent and polyfunctional compound used as needed may be added during the preparation of the molten mixture, or may be added to the filtered molten mixture in the polycondensation step.

The intrinsic viscosity (measured in 20° C. methylene chloride) of the polycarbonate (the reaction product obtained above) is usually 0.10 to 1.0 dL/g, and preferably 0.30 to 0.65 dL/g.

The melt flow rate of this polycarbonate, with a product of high viscosity, should be 1 to 70 g/10 min, and preferably 2 to 50 g/10 min, as measured at a temperature of 300° C. and a load of 1.2 kg, and with a product of low viscosity, should be 5 to 20 g/10 min, and preferably 8 to 16 g/10 min, as measured in the same manner.

The present invention, as discussed above, yields a polycarbonate (reaction product) with excellent initial hue (hereinafter referred to as (A) polycarbonate).

With the present invention, it is preferable to add (B) a sulfur-containing oxidative compound with a pKa value of 3 or less and/or a derivative formed from said oxidative compound (hereinafter referred to as (B) oxidative compound) immediately after the polycondensation reaction, without cooling the polycarbonate A obtained as the reaction product above.

It is even more preferable to further add (C) a specific amount of water along with the oxidative compound (B).

With the present invention, examples of sulfur-containing oxidative compounds and derivatives formed from said oxidative compounds include sulfurous acid, sulfuric acid, sulfinic acid-based compounds, sulfonic acid-based compounds, and derivatives of these. Specific examples of sulfurous acid derivatives include dimethylsulfurous acid, diethylsulfurous acid, dipropylsulfurous acid, dibutylsulfurous acid, and diphenylsulfurous acid.

Specific examples of sulfuric acid derivatives include dimethylsulfuric acid, diethylsulfuric acid, dipropylsulfuric acid, dibutylsulfuric acid, and diphenylsulfuric acid.

Examples of sulfinic acid-based compounds include benzenesulfinic acid, toluenesulfinic acid, and naphthalenesulfinic acid.

Examples of sulfonic acid-based compounds and derivatives thereof include the compounds expressed by the following General Formula XIII, and ammonium salts thereof.
Chemical Formula 10

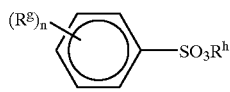

[XIII]

In the formula, $R^g$ is a hydrocarbon group or halogen substituted hydrocarbon group with 1 to 50 carbon atoms, $R^h$ is a hydrogen atom or a hydrocarbon group or halogen substituted hydrocarbon group with 1 to 50 carbon atoms, and n is an integer from 0 to 3.

Examples of these sulfonic acid-based compounds and derivatives thereof include benzenesulfonic acid, p-toluenesulfonic acid, and other sulfonic acids; methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate, and other sulfonic esters; and ammonium p-toluenesulfonate and other sulfonic acid ammonium salts.

Trifluoromethanesulfonic acid, naphthalenesulfonic acid, sulfonated polystyrene, a methyl acrylate-sulfonated styrene copolymer, or another such sulfonic acid compound may also be used.

Two or more of these may also be used together.

With the present invention, sulfonic acid-based compounds expressed by the above General Formula XIII and derivatives thereof can be used favorably as the oxidative compound B.

It is particularly favorable to use an ester compound in which $R^g$ in the above General Formula XIII is a substituted aliphatic hydrocarbon group with 1 to 6 carbons, $R^h$ is a substituted aliphatic hydrocarbon group with 1 to 8 carbons, and n is an integer from 0 to 3. In specific terms, ethyl benzenesulfonate, butyl benzenesulfonate, methyl p-toluenesulfonate, ethyl p-toluenesulfonate, butyl p-toluenesulfonate, and the like can be used favorably.

Of these, it is particularly favorable to use methyl p-toluenesulfonate, ethyl p-toluenesulfonate, or butyl p-toluenesulfonate.

Two or more of these may also be used together.

With the present invention, the above-mentioned (B) oxidative compound should be contained in an amount of 1 to 20 times (molar), and preferably 1 to 10 times (molar), and even more preferably 1 to 8 times (molar), with respect to the amount of alkali (alkaline earth) metal compound used in the reaction of the above-mentioned (A) polycarbonate.

When the (B) oxidative compound is added in this amount to the reaction product (polycarbonate) (A), the alkaline earth metal compound present in the polycarbonate is neutralized or weakened, ultimately allowing a polycarbonate with even better residence stability and water resistance to be obtained.

Also, with the present invention, it is preferable to add (C) water along with the above-mentioned (B) oxidative compound, and this water should be added in an amount of 5 to 1000 ppm, and preferably 10 to 500 ppm, and even more preferably 20 to 300 ppm, with respect to the (A) polycarbonate.

When (C) water is thus added along with the (B) oxidative compound, the efficiency of the (B) oxidative compound at neutralizing the basic catalyst in the (A) polycarbonate will be enhanced, the residence stability during melting will be superior, and a polycarbonate with superior hue, transparency, water resistance, and weatherproofness will be obtained.

If more than 1000 ppm water is added, the polycarbonate will be more susceptible to hydrolysis, and the physical properties of the polycarbonate may suffer.

With the present invention, it is preferable to obtain a polycarbonate by adding the above-mentioned (B) oxidative compound and a small amount of (C) water to the (A) polycarbonate (the reaction product), and kneading these components.

The kneading of the (A) polycarbonate, (B) oxidative compound, and (C) water is accomplished with an ordinary kneader, such as a uniaxial extruder, a biaxial extruder, or a static mixer, and these kneaders can be used effectively with or without venting.

In specific terms, it is preferable for the (B) oxidative compound and (C) water to be added while the (A) polycarbonate obtained by polycondensation reaction is still in a molten state inside the reactor or extruder. The (B) oxidative compound and (C) water may be added separately or simultaneously, and there are no restrictions on the order of addition, but simultaneous addition is preferred.

In more specific terms, in the manufacture of a polycarbonate from (A) a polycarbonate, (B) an oxidative compound, and (C) water, for example, the (B) oxidative compound and (C) water may be added to the (A) polycarbonate obtained in a polycondensation reaction in a reactor, thereby forming a polycarbonate, and then passing this through an extruder to pelletize it, or the (A) polycarbonate obtained in the polycondensation reaction may be passed from the reactor through the extruder and thereby pelletized, during which time the (B) oxidative compound and (C) water may be added and kneaded to produce a polycarbonate.

In general, when a polycarbonate is used, the polycarbonate pellets are re-melted and various additives such as a thermal stabilizer are added thereto. The polycarbonate pellets obtained with the present invention will have enhanced thermal stability and superior molten residence stability whether they are melted during the addition of the various additives or during molding, so pyrolysis as a result of melting is particularly suppressed, and there is less tendency for the molecular weight to decrease or for coloration to occur.

To the extent that the object of the present invention is not compromised, it is preferable in the present invention for (D) additives to be added along with the above-mentioned (B) oxidative compound and (C) water to the polycarbonate (A).

These (D) additives can be added simultaneously with the (B) oxidative compound and (C) water to the molten polycarbonate (A), or they can be added separately. With the present invention, of the (D) additives listed below, those that are reactive should be added after the (B) oxidative compound and (C) water have been added.

A wide range of additives that are commonly added to a polycarbonate as dictated by the intended application can be used as the (D) additives used in the present invention, specific examples of which include thermal stabilizers, epoxy compounds, UV absorbents, parting agents, colorants, antistatic agents, slip agents, anti-blocking agents, lubricants, anti-fogging agents, natural oils, synthetic oils, waxes, organic fillers, and inorganic fillers.

Of these, the use of the thermal stabilizers, epoxy compounds, UV absorbents, parting agents, colorants, and so on given below is preferred. Two or more types of these can also be used together.

Specific examples of thermal stabilizers used in the present invention include phosphorus compounds, phenol-based stabilizers, organic thioether-based stabilizers, and hindered amine-based stabilizers.

Examples of phosphorus compounds include phosphoric acid, phosphorous acid, hypophosphorous acid, pyrophosphoric acid, polyphosphoric acid, phosphoric esters, and phosphorous esters.

Examples of phosphoric esters include trimethyl phosphate, triethyl phosphate, tributyl phosphate, trioctyl phosphate, tridecyl phosphate, trioctadecyl phosphate, distearyl pentaerythrityl diphosphate, tris(2-chloroethyl) phosphate, tris(2,3-dichloropropyl) phosphate, and other trialkyl phosphates; tricyclohexyl phosphate and other tricycloalkyl phosphates; and triphenyl phosphate, tricresyl phosphate, tris(nonylphenyl) phosphate, 2-ethylphenyldiphenyl phosphate, and other triaryl phosphates.

Examples of phosphorous esters include compounds expressed by the following general formula.

(In the formula, R is an alicyclic hydrocarbon group, an aliphatic hydrocarbon group, or an aromatic hydrocarbon group, and these groups may be the same or different.)

Examples of the compounds expressed by this formula include trimethyl phosphite, triethyl phosphite, tributyl phosphite, trioctyl phosphite, tris(2-ethylhexyl) phosphite, trinonyl phosphite, tridecyl phosphite, trioctadecyl phosphite, tristearyl diphosphite, tris(2-dichloroethyl) phosphite, tris(2,3-dichloropropyl) phosphite, and other trialkyl phosphites; tricyclohexyl phosphite and other tricycloalkyl phosphites; triphenyl phosphite, tricresyl phosphite, tris(ethylphenyl) phosphite, tris(2,4-di-t-butylphenyl) phosphite, tris(nonylphenyl) phosphite, tris(hydroxyphenyl) phosphite, and other triaryl phosphites; and phenyldidecyl phosphite, diphenyldecyl phosphite, diphenylisooctyl phosphite, phenylisooctyl phosphite, 2-ethylhexyldiphenyl phosphite, and other arylalkyl phosphites.

Other examples of phosphorous esters include distearylpentaerythrityl diphosphite and bis(2,4-di-t-butylphenyl) pentaerythrityl diphosphite. Two or more types of these can be used together.

Of these, phosphorous esters expressed by the above general formula are preferred, with aromatic phosphorous esters being particularly favorable, and with tris(2,4-di-t-butylphenyl) phosphite being especially good.

Examples of phenol-based stabilize include n-octadecyl-3-(4-hydroxy-3',5'-di-t-butylphenyl) propionate, tetrakis [methylene-3-(3',5'-di-t-butyl-4-hydroxyphenyl) propionate] methane, 1,1,3-tris(2-methyl-4-hydroxy-5-t-butylphenyl)butane, distearyl(4-hydroxy-3-methyl-5-t-butyl)benzyl malonate, and 4-hydroxymethyl-2,6-di-t-butylphenol.

Examples of organic thioether-based stabilize include dilauryl thiodipropionate, distearyl thiodipropionate, dimyristyl-3,3'-thiodipropionate, ditridecyl-3,3'-thiodipropionate, and pentaerythritol-tetrakis(β-laurylthiopropionate).

Examples of hindered amine-based stabilize include bis (2,2,6,6-tetramethyl-4-piperidyl) sebacate, bis(1,2,2,6,6-pentamethyl4-piperidyl) sebacate, 1-[2-{3-(3,5-di-t-butyl-4-hydroxyphenyl)propionyloxy}ethyl]-4-13-(3,5-di-t-butyl-4-hydroxyphenyl) propionyloxy)-2,2,6,6-tetramethylpiperidine, 8-benzyl-7,7,9,9-tetramethyl-3-octyl-1,2,3-triazaspiro[4,5]undecan-2,4-dione, 4-benzoyloxy-2,2,6,6-tetramethylpiperidine, bis(1,2,2,6,6-pentamethyl-4-piperidyl) 2-(3,5-di-t-butyl-4-hydroxybenzyl)-2-n-butylmalonate, and tetrakis(2,2,6,6-tetramethyl4-piperidyl) 1,2,3,4-butanetetracarboxylate.

Two or more types of these compounds can also be used together.

These thermal stabilizers can be used in an amount of 0.001 to 5 weight parts, and preferably 0.005 to 0.5 weight parts, and even more preferably 0.01 to 0.3 weight parts, per 100 weight parts of polycarbonate.

The thermal stabilizer may be added in the form of a solid or in the form of a liquid.

It is favorable to add this thermal stabilizer while the (A) polycarbonate is still in a molten state, just as with (B) or (C), because this will allow the manufacture of a polycarbonate with lower thermal hysteresis during manufacture, and since the polycarbonate pellets thus obtained will contain a thermal stabilizer, pyrolysis during re-melting can be suppressed.

A compound having one or more epoxy groups per molecule is used as the epoxy compound. Specific examples include epoxified soy oil, epoxified linseed oil, phenyl glycidyl ether, allyl glycidyl ether, t-butyl phenyl glycidyl ether, 3,4-epoxycyclohexylmethyl-3',4'-epoxycyclohexyl carboxylate, 3,4-epoxy-6-methylcyclohexyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexyl ethylene oxide, cyclohexylmethyl-3,4-epoxycyclohexyl carboxylate, 3,4-epoxy-6-methylcyclohexyl-6'-methylcyclohexyl carboxylate, bisphenol A diglycidyl ether, tetrabromobisphenol A glycidyl ether, diglycidyl ester of phthalic acid, diglycidyl ester of hexahydrophthalic acid, bis-epoxydicyclopentadienyl ether, bis-epoxyethylene glycol, bis-epoxycyclohexyl adipate, butadiene diepoxide, tetraphenyl ethylene epoxide, octylepoxyphthalate, epoxified polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3,4'-epoxycyclohexyl carboxylate, 4,6-dimethyl-2,3-epoxycyclohexyl-3,4'-epoxycyclohexyl carboxylate, 4,5-epoxytetrahydrophthalic anhydride, 3-t-butyl-4,5-epoxytetrahydrophthalic anhydride, diethyl4,5-epoxy-cis-1,2-cyclohexyl dicarboxylate, and di-n-butyl-3-t-butyl-4,5-epoxy-cis-1,2-cyclohexyl dicarboxylate.

Two or more types of these compounds can also be used together.

Of these, an alicyclic epoxy compound, and particularly 3,4-epoxycyclohexylmethyl-3',4'-epoxycyclohexyl carboxylate, can be used preferably.

This epoxy compound can be added in an amount of 1 to 2000 ppm, and preferably 10 to 1000 ppm, with respect to the above-mentioned (A) polycarbonate.

In particular, when an epoxy compound is used as a (D) additive, it is preferable to add the epoxy compound after the (B) oxidative compound and (C) water have been added, so as to neutralize any excess (B) oxidative compound that has been added. If the (B) oxidative compound is thus neutralized with an epoxy compound, a polycarbonate with particularly superior water resistance and transparency will be obtained.

Any ordinary UV absorbent can be used as the above-mentioned UV absorbent, and while there are no particular restrictions thereon, examples include salicylic acid-based UV absorbents, benzophenone-based UV absorbents, benzotriazole-based UV absorbents, and cyanoacrylate-based UV absorbents.

Specific examples of salicylic acid-based UV absorbents include phenyl salicylate and p-t-butylphenyl salicylate.

Specific examples of benzophenone-based UV absorbents include 2,4-dihydroxybenzophenone, 2-hydroxy-4-methoxybenzophenone, 2,2-dihydroxy4-methoxybenzophenone, 2,2'-dihydroxy-4-methoxybenzophenone, 2,2'-dihydroxy-4,4'-dimethoxybenzophenone, 2-hydroxy4-methoxy-2'-carboxybenzophenone, 2-hydroxy-4-methoxy-5-sulfobenzophenone trihydrate, 2-hydroxy4-n-octoxybenzophenone, 2,2',4,4'-tetrahydroxybenzophenone, 4-dodecyloxy-2-hydroxybenzophenone, bis(5-benzoyl4-hydroxy-2-methoxyphenyl)methane, and 2-hydroxy4-methoxybenzophenone-5-sulfonic acid.

Specific examples of benzotriazole-based UV absorbents include 2-(2'-hydroxy-5'-methyl-phenyl)benzotriazole, 2-(2'-hydroxy-3',5'-di-t-butyl-phenyl)benzotriazole, 2-(2'-hydroxy-3'-t-butyl-5'-methyl-phenyl)-5-chlorobenzotriazole, 2-(2'-hydroxy-3',5'-di-t-butyl-phenyl)-5-chlorobenzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3",4",5",6"-tetrahydrophthalimidemethyl)-5'-methylphenyl]benzotriazole, and 2,2'-methylenebis[4-(1,1,3,3-tetramethylbutyl)-6-(2H-benzotriazol-2-yl)phenol].

Specific examples of cyanoacrylate-based UV absorbents include 2-ethylhexyl-2-cyano-3,3-diphenyl acrylate and ethyl-2-cyano-3,3-diphenyl acrylate. Two or more types of these can be used together.

The UV absorbent usually can be used in an amount of 0.001 to 5 weight parts, and preferably 0.005 to 1.0 weight part, and even more preferably 0.01 to 0.5 weight part, per 100 weight parts of the (A) polycarbonate.

Any commonly known parting agent can be used, with no particular restrictions thereon, as the above-mentioned parting agent. Examples include natural and synthetic paraffins, polyethylene waxes, fluorocarbons and other hydrocarbon-based parting agents; stearic acid, hydroxystearic acid, and other higher fatty acids, oxy fatty acids, and other such fatty acid-based parting agents; stearic acid amide, ethylene-bis-stearamide, and other fatty acid amides, alkylene-bis fatty acid amides, and other such fatty acid amide-based parting agents; stearyl alcohol, cetyl alcohol, and other aliphatic alcohols, polyhydric alcohols, polyglycols, polyglycerols, and other such alcohol-based parting agents; butyl stearate, pentaerythritol tetrastearate, and other fatty acid lower alcohol esters, fatty acid polyhydric alcohol esters, fatty acid polyglycol esters, and other such fatty acid ester-based parting agents; and silicone oil and other such silicone-based parting agents. Two or more types of these compounds can also be used together.

The parting agent usually can be used in an amount of 0.001 to 5 weight parts, and preferably 0.005 to 1 weight part, and even more preferably 0.01 to 0.5 weight part, per 100 weight parts of the (A) polycarbonate.

The colorant may be a pigment or a dye, and either an inorganic or an organic colorant may be used, or these may be used together.

Specific examples of inorganic colorants include titanium dioxide, iron oxide red, and other oxides, alumina white and other hydroxides, zinc sulfide and other sulfides, selenides, Prussian blue and other ferrocyanides, zinc chromate, molybdenum red, and other chromates, barium sulfate and other sulfates, calcium carbonate and other carbonates, ultramarine blue and other silicates, manganese violet and other phosphates, carbon black and other carbons, and bronze powder, aluminum powder, and other metal powder colorants.

Specific examples of colorants include naphthol green B and other nitroso colorants, naphthol yellow S and other nitro colorants, lithol red, Bordeaux 10B, naphthol red, chromophthal yellow, and other azo colorants, phthalocyanine blue, fast sky blue, and other phthalocyanine colorants, and indanthrone blue, quinacrylidone violet, dioxazine violet, and other condensed polycyclic colorants.

The colorant usually can be used in an amount of $1\times10^{-6}$ to 5 weight parts, and preferably $1\times10^{-5}$ to 3 weight part, and even more preferably $1\times10^{-5}$ to 1 weight part, per 100 weight parts of the (A) polycarbonate.

It is preferable for the above-mentioned (B) composition, (C) water, and (D) additives to be added to the polycarbonate (A) that is in a molten state as discussed above.

With the present invention, the produced polycarbonate may be subjected to a filtration treatment while the polycarbonate is still in a molten state. This filtration treatment allows any gel or other such foreign matter produced in the polycondensation reaction to be removed.

When the (B) composition, (C) water, and (D) additives are added to the polycarbonate (A), this filtration treatment may be performed after these additives have been added and kneaded.

There are no particular restrictions on the filter used in this filtration treatment of the bisphenol, and any commonly used filter can be used. In specific terms, a filter of the candle type, the pleated type, the leaf type, or the like can be used. This filter should have an absolute filtration precision (pore diameter) of 50 μm or less, and preferably 20 μm or less. The use of a filter such as this makes it possible to shorten the residence time of the polycarbonate during filtration, and allows the thermal degradation of the polycarbonate to be prevented. The service life of the filter will also be longer.

The polycarbonate manufactured in this manner can be pelletized as needed and used in a variety of applications. Because a polycarbonate obtained by the manufacturing method pertaining to the present invention does not contain any microparticles on the micron order, it is suitable as an optical material, and particularly an optical disk molding material.

Effects of the Invention

With the polycarbonate manufacturing method pertaining to the present invention, a polycarbonate with superior transparency, hue, heat resistance, water resistance, and so on can be obtained.

A polycarbonate manufactured according to the method of the present invention can be used favorably not only as a common molding material, but also as sheeting or another such construction material, in automobile headlight lenses, eyeglasses, and other such optical lenses, optical recording materials, and so on, and is particularly favorable as an optical disk molding material.

WORKING EXAMPLES

The present invention will now be described in further detail through working examples, but the present invention is not limited to or by these working examples.

The microparticle count and MFR of the polycarbonates manufactured in the working examples in this Specification were measured by the following methods.

Measurement of Microparticles

The polycarbonate was diluted with chloroform that had been filtered with a 0.2 μm membrane filter, after which the numbers of microparticles of 0.5 to 1.0 μm, 1.0 to 2.0 μm, and over 2.0 μm were measured by microparticle meter (KL-20, made by Rion). The results are given as the number per gram of polycarbonate.

MFR

This was measured at a temperature of 250° C. and a load of 1.2 kg as set forth in JIS K 7210.

Working Example 1

The polycarbonate polycondensation apparatus was equipped with one agitation tank for the mixing of the raw materials, two pre-polymerization tanks, two horizontal agitation polymerization tanks, and one biaxial extruder, and had a cartridge filter of Fluorite FLTR200 (PTFE membrane filter, made by Japan MemTech) installed between the agitation tank for the mixing of the raw materials and the pre-polymerization tank A. The reaction conditions were as follows.

TABLE 1

|  | Pressure (torr) | Temperature (° C.) | Mean residence time (hours) |
| --- | --- | --- | --- |
| Agitation tank | Atmospheric pressure (nitrogen atmosphere) | 160 | 2 |
| Pre-polymerization tank A | 100 | 230 | 1 |
| Pre-polymerization tank B | 20 | 240 | 0.5 |
| Horizontal agitation polymerization tank A | 3–5 | 270 | 0.5 |
| Horizontal agitation polymerization tank B | 0.1–1.0 | 275 | 0.5 |

First, molten bisphenol A (feed rate: 36.0 kg/hr) that had been filtered through a 10 μm filter and molten diphenyl carbonate (feed rate: 34.7 kg/hr) that had been pumped directly through a pipe after distillation and filtered through a 10 μm filter were continuously fed to the agitation tank for the mixing of raw materials, which was maintained at the temperature given above. 0.11 mol ($2.5\times10^{-4}$ mol/mol of bisphenol A) of tetramethylanmmonium hydroxide and 0.00044 mol ($1\times10^{-6}$ mol/mol of bisphenol A) of sodium hydroxide were added as catalysts, and a uniform solution was manufactured.

Next, said solution was filtered through a fluororesin membrane filter that had an absolute filtration precision of 1.0 jim and that was positioned at the agitation tank outlet, after which polymerization was conducted under the reaction conditions in Table 1 above. The pressure in the horizontal agitation polymerization tank A and the horizontal agitation polymerization tank B was adjusted while checking the MFR, which was measured every 2 hours, and the apparatus was operated while making every effort to keep the MFR at 11.0 g/10 minutes. Additives were added and kneaded in the biaxial extruder, after which a final filtration was performed with a 20 gm filter, and this product was pelletized.

Table 2 gives the microparticle count in the polycarbonate thus manufactured, and the length of time the filter could be used (filter service life).

Working Example 2

Other than using a cartridge filter featuring a PTFE membrane filter with an absolute filtration precision of 0.5 μm as the fluororesin membrane filter, the same operation as in Working Example 1 was carried out to produce and evaluate polycarbonate pellets.

The results are given in Table 2.

Working Example 3

Other than using a cartridge filter featuring a PTFE membrane filter with an absolute filtration precision of 0.2 μm as the fluororesin membrane filter, the same operation as in Working Example 1 was carried out to produce and evaluate polycarbonate pellets.

The results are given in Table 2.

Working Example 4

Other than using a cartridge filter featuring a PTFE membrane filter with an absolute filtration precision of 0.1 μm as the fluororesin membrane filter, the same operation as in Working Example 1 was carried out to produce and evaluate polycarbonate pellets.

The results are given in Table 2.

Working Example 5

Molten bisphenol A (feed rate: 36.0 kg/hr) that had not been filtered and molten diphenyl carbonate (feed rate: 34.7 kg/hr) that had been pumped directly through a pipe after distillation and had not been filtered were continuously fed to the agitation tank for the mixing of raw materials, which was maintained at the temperature given above.

Next, said solution was filtered through a fluororesin membrane filter that had an absolute filtration precision of 0.2 μm and that was positioned at the agitation tank outlet, after which polycondensation was conducted under the same reaction conditions as in Working Example 1, a final filtration was similarly performed with a 20 μm filter, and this product was pelletized.

The results are given in Table 2.

Comparative Example 1

Other than not performing the filtration treatment of the molten mixture of bisphenol A and diphenyl carbonate as in Working Example 1, the same operation as in Working Example 1 was carried out to produce and evaluate polycarbonate pellets.

The results are given in Table 2.

Comparative Example 2

Other than using an SUS candle filter (absolute filtration precision: 20 μm) in place of the fluororesin membrane filter used in Working Example 1, the same operation as in Working Example 1 was carried out to produce and evaluate polycarbonate pellets.

The results are given in Table 2.

TABLE 2

| | Substance being filtered | Type of filter | Filtration precision | Microparticle count (number/g) | | | Filter service life (days) |
| --- | --- | --- | --- | --- | --- | --- | --- |
| | | | | 0.5–1.0 μm | 1.0–2.0 μm | over 2.0 μm | |
| Working Example 1 | Filtration of molten mixture of bisphenol and carbonic diester | PTFE membrane filter | 1.0 μm | 3260 | 105 | 10 | 22 |
| Working Example 2 | Filtration of molten mixture of bisphenol and carbonic diester | PTFE membrane filter | 0.5 μm | 2050 | 92 | 6 | 20 |
| Working Example 3 | Filtration of molten mixture of bisphenol and carbonic diester | PTFE membrane filter | 0.2 μm | 1570 | 85 | 5 | 15 |
| Working Example 4 | Filtration of molten mixture of bisphenol and carbonic diester | PTFE membrane filter | 0.1 μm | 330 | 37 | 0 | 10 |
| Working Example 5 | Filtration of molten mixture of bisphenol and carbonic diester | PTFE membrane filter | 0.2 μm | 2040 | 102 | 35 | 3 |
| Comparative Example 1 | No filtration | | — | 13990 | 1080 | 105 | — |
| Comparative Example 2 | Filtration of molten mixture of bisphenol and carbonic diester | SUS membrane filter | 20 μm | 10940 | 550 | 80 | 20 |

Pre-filtered bisphenol and carbonic diester were used as the raw materials in Working Examples 1 to 4.
Unfiltered bisphenol and carbonic diester were used as the raw materials in Working Example 5.

What is claimed is:

1. A method for manufacturing an optical polycarbonate, by the melt polycondensation of a bisphenol and a carbonic diester, wherein a molten mixture of a bisphenol and a carbonic diester is first filtered through a membrane filter made of a fluororesin, and melt polycondensation is subsequently conducted.

2. A method for manufacturing an optical polycarbonate as defined in claim 1, wherein said membrane filter made of a fluororesin has an absolute filtration precision of 1.0 μm or less.

3. A method for manufacturing an optical polycarbonate as defined in claim 1 wherein molten mixture of a bisphenol and a carbonic diester is obtained by first separately filtering a bisphenol that is in a molten state and a carbonic diester that is in a molten state, and then mixing the bisphenol and the carbonic diester.

4. A method for manufacturing an optical polycarbonate as defined in claim 3, wherein the filtration of the bisphenol that is in a molten state and the carbonic diester that is in a molten state is carried out using a filter having an absolute filtration precision of 20 µm or less.

5. A method for manufacturing an optical polycarbonate as defined in claim 1, wherein the polycarbonate that is the reaction product of the melt polycondensation is further filtered while still in a molten state.

6. A method for manufacturing an optical polycarbonate as defined in claim 5, wherein the filtration of the polycarbonate reaction product is carried out using a filter having an absolute filtration precision of 50 µm or less.

7. A method for manufacturing an optical polycarbonate as defined in claim 1 wherein the bisphenol is bisphenol A.

* * * * *